UNITED STATES PATENT OFFICE.

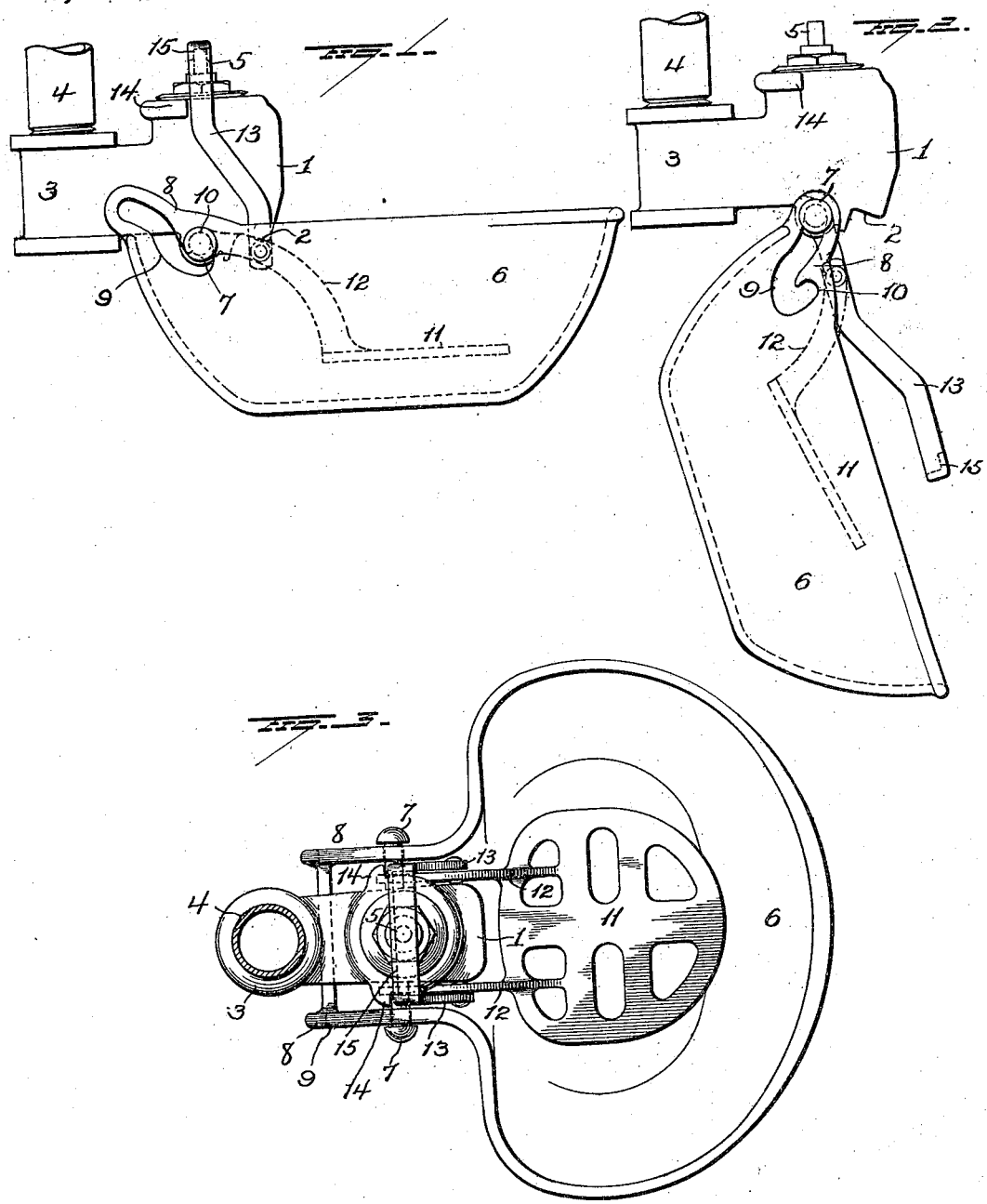

HUGO C. RASSMANN, OF BEAVER DAM, WISCONSIN.

WATERING DEVICE FOR CATTLE.

1,237,096.   Specification of Letters Patent.   Patented Aug. 14, 1917.

Application filed April 21, 1917. Serial No. 163,650.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle and particularly to such as employ means adapted to be operated by the cattle to control the supply of water to the bowl,—one object of my present invention being to so mount the bowl that it may be dropped to discharge its contents and to facilitate cleaning, and so that it may be retained in its normal horizontal position without the employment of separate latch devices.

A further object is to simplify and improve drinking devices for cattle, embodying a hinged bowl, and to cheapen the cost of construction without detracting from their efficiency.

With these and other objects in view, the invention consists in certain novel features of construction and combinations of parts as hereinafter set forth and pointed out in the claims.

In the accompanying drawings; Figure 1 is a side elevation of a watering device embodying my improvements showing the bowl in its normal horizontal position; Fig. 2 is a similar view showing the bowl and animal-operated devices in dropped position, and Fig. 3 is a plan view.

1 represents a valve casing or fount provided with a discharge outlet 2 and with a coupling member 3 which is closed at one end and with which a supply pipe 4 is connected. The supply pipe may extend upwardly from the coupling as shown, or the upper end of the coupling may be closed and the pipe 4 made to extend downward from said coupling.

The casing or fount contains a valve (not shown) which may be constructed as illustrated in my previous Patent No. 1,210,693 issued January 2, 1917, with its stem 5 projecting above the casing, and this valve will be controlled as hereinafter explained.

The bowl is represented at 6 and a pin or rod 7 affords a hinged connection for said bowl to the lower portion of the fount or casing 1. Enlargements 8 are formed on the bowl so as to be disposed at respective sides of the fount or casing 1, and in these enlarged or flanged portions of the bowl elongated slots 9 are formed. Each of these slots is approximately S-shaped, with an upwardly projecting or hook-shaped portion 10 at the inner end and these slots receive the hinge pin 7 which is carried by the fount or casing 1. When the bowl is in operative position, the hinge pin will rest in the hook-shaped portions 10 of the slots 9 and the rear edge of the bowl will bear upwardly against the fount or casing 1,—said bowl being thus retained securely in horizontal position.

When it is desired to lower or drop the bowl, this may be easily accomplished by first raising the bowl slightly to free the hinge pin from the hook-shaped portions 10 of the slots 9 and then permitting the bowl to move so that the hinge pin will become disposed at the rear ends of the slots 9, when the bowl will be permitted to hang suspended from the hinge pin, as shown in Fig. 2. It is apparent that by reversing these movements, the bowl may be readily returned to and locked in its normal horizontal position.

An animal-operated platform 11 is located within the bowl and provided with lever arms 12 pivotally supported coincident with the hinge support of the bowl, being pivotally mounted on the hinge pin 9. The depending arms of a saddle 13 are pivotally connected at their lower ends to the lever arms 12 in advance of the pivotal mounting of the latter,—said saddle embracing the fount or casing 1, so that its cross bar will engage the valve stem 5 and operate the same when the platform 11 is depressed by the nose of the animal. In order to prevent the saddle from being moved off of the valve stem if the animal should accidentally lift the platform and lever, I may provide lugs or stops 14 on the fount or casing 1 to limit the rearward movement of the saddle. I may also provide the cross bar of the saddle with a depending lug 15 to prevent said saddle from being pulled forwardly from the valve stem.

When the bowl is lowered or dropped as hereinbefore explained, the saddle may be removed from the valve stem and said saddle 13, as well as the platform 11 and lever 12, may be lowered with the bowl as shown in Fig. 2.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a fount and a bowl, of connecting means between the bowl and the fount comprising a slotted member and a member mounted in said slotted member, said bowl having a part removed from said connecting means and adapted to bear freely against the fount when the bowl is in normal operative position.

2. The combination with a water supply means provided with a valve, and a bowl to receive water from said supply means, of pin and slot connecting means between the bowl and the water supply means, said connecting means being located to cause a portion of the bowl removed from said connecting means to bear freely against a portion of the water supply means, and an animal controlled device in said bowl and provided with a part to operate the valve of the water supply means.

3. The combination with a fount having pivotal supports for a bowl, of a bowl having parallel elongated slots receiving said pivotal supports, said slots and pivotal supports being disposed to permit an edge of the bowl to engage under the fount to retain the bowl in horizontal position and to permit the bowl to be moved from such engagement with the fount and swing downwardly on said pivotal supports.

4. The combination with a valved fount and a bowl having hinge connection therewith, of animal-operated means projecting into the bowl and adapted for connection with the stem of the valve of said valved fount, said animal-operated means having a pivotal mounting coincident with the hinge connection of the bowl with the fount.

5. The combination with a valve fount, a bowl and a pin hinging said bowl to the fount, of an animal-operated device pivotally mounted on said hinge pin and having a part projecting into the bowl and a part for connection with the valve of the valved fount.

6. The combination with a fount and a hinge pin under the same, of a bowl having slots to receive the hinge pin, each slot being hook shaped at one end, whereby the bowl will be normally supported in horizontal position with its edge bearing upwardly against the fount.

7. The combination with a valved fount provided with an upwardly projecting valve stem, and a bowl, of a pivoted lever, an animal-operated platform on said lever and disposed within the bowl, a saddle pivoted directly to said lever and adapted removably to engage said valve stem, and stop devices preventing accidental displacement of said saddle from the valve stem.

In testimony whereof, I have signed this specification in the presence of two subscribing witnesses.

HUGO C. RASSMANN.

Witnesses:
L. L. GOCKER,
E. J. LAWRENCE.

Copies of this patent may be obtained for five cents each, by addressing the "Commissioner of Patents, Washington, D. C."